(12) United States Patent
Sagar et al.

(10) Patent No.: US 8,103,629 B2
(45) Date of Patent: *Jan. 24, 2012

(54) BI-DIRECTIONAL DATA MODIFICATION WITH SYNCHRONIZATION

(75) Inventors: Akash J. Sagar, Redmond, WA (US); George P. Moromisato, Seattle, WA (US); Richard Yiu-Sai Chung, Bothell, WA (US); Paresh S. Suthar, Redmond, WA (US); Raymond E. Ozzie, Seattle, WA (US); Jack E. Ozzie, North Bend, WA (US); Matthew S. Augustine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/070,409

(22) Filed: Mar. 23, 2011

(65) Prior Publication Data

US 2011/0173157 A1 Jul. 14, 2011

Related U.S. Application Data

(63) Continuation of application No. 12/906,916, filed on Oct. 18, 2010, now Pat. No. 7,930,272, which is a continuation of application No. 11/767,001, filed on Jun. 22, 2007, now Pat. No. 7,831,558.

(51) Int. Cl.
 *G06F 17/30* (2006.01)
(52) U.S. Cl. .................... 707/626; 707/635; 707/809
(58) Field of Classification Search .............. 707/626, 707/635, 809
See application file for complete search history.

(56) References Cited

U.S. PATENT DOCUMENTS

| | | | |
|---|---|---|---|
| 5,315,709 | A | 5/1994 | Alston, Jr. et al. |
| 5,870,759 | A | 2/1999 | Bauer et al. |
| 7,007,041 | B2 | 2/2006 | Multer et al. |
| 7,207,008 | B1 | 4/2007 | Koch et al. |
| 7,734,690 | B2 | 6/2010 | Moromisato et al. |
| 7,831,558 | B2 | 11/2010 | Sagar |
| 2002/0057803 | A1 | 5/2002 | Loos et al. |
| 2003/0009602 | A1 | 1/2003 | Jacobs et al. |
| 2003/0220966 | A1 | 11/2003 | Hepper et al. |
| 2004/0103167 | A1 | 5/2004 | Grooters et al. |
| 2004/0172423 | A1 | 9/2004 | Kaasten et al. |
| 2005/0198299 | A1 | 9/2005 | Beck et al. |
| 2005/0203935 | A1 | 9/2005 | McArdle |
| 2006/0080363 | A1 | 4/2006 | Vadlamani et al. |
| 2006/0218492 | A1 | 9/2006 | Andrade |
| 2006/0247961 | A1 | 11/2006 | Klemow |
| 2006/0288053 | A1 | 12/2006 | Holt et al. |
| 2007/0055887 | A1 | 3/2007 | Cross et al. |
| 2008/0155112 | A1 | 6/2008 | Ma et al. |
| 2008/0212616 | A1 | 9/2008 | Augustine et al. |

OTHER PUBLICATIONS

International Search Report for PCT/US2008/067623 mailed Mar. 24, 2009; 11 pages.
Reiss, Spencer, "Here Comes Trouble", Wired Magazine, Date: Feb. 2007, http://www.wired.com/wired/archive/15.02/trouble_pr.html.
CN Patent Application 200880022152.2; First Office Action dated Aug. 11, 2011.

*Primary Examiner* — James Trujillo
*Assistant Examiner* — William Spieler

(57) ABSTRACT

Systems and methods for synchronizing data between endpoints, including the modification of data on an endpoint without necessarily modifying data that is communicated between endpoints are disclosed. In such systems and methods the representation of data on an endpoint may be modified so that constraints on that particular endpoint are enforced, without requiring a similar or the same modification to the data when it is synchronized to other endpoints.

20 Claims, 5 Drawing Sheets

BI-DIRECTIONAL DATA MODIFICATION WITH SYNCHRONIZATION

CROSS-REFERENCE TO RELATED APPLICATIONS

This patent application is a continuation of, and claims priority from, U.S. patent application Ser. No. 12/906,916 filed Oct. 18, 2010, which is a continuation of, and claims priority from, U.S. patent application Ser. No. 11/767,001 filed on Jun. 22, 2007, now U.S. Pat. No. 7,831,558 issued Nov. 9, 2010, both of which are incorporated herein by reference in their entirety.

BACKGROUND

A wide variety of synchronization systems exist that synchronize data between different endpoints, such as between different computer systems. In some cases data that is synchronized, in at least some representations, may be associated with or subject to particular constraints. In just some examples of such constraints, a computer file system may require that a file name use only particular characters, that files in the same directory have unique names, that files be located in a directory, and so on.

To represent and enforce constraints, in some cases a synchronization system may itself be designed or extended to have knowledge of and to enforce particular constraints uniformly across all synchronization endpoints. In other cases, additional logic that operates in addition to or "on top of" a synchronization system may be provided or defined so that constraints are enforced uniformly when data is synchronized by the synchronization system.

Extending a synchronization system to enforce constraints that may be specific to or relevant only for certain types of data or particular endpoints may complicate various aspects of the synchronization system, including making it more difficult to change or update how the synchronization system operates. For example, it may be difficult or even impossible in some cases to add a new type of endpoint to an existing system of synchronization endpoints when the new endpoint requires that data conform to new constraints. Furthermore, applying constraints uniformly, so that every endpoint applies the same constraints to synchronized data, may also cause potential issues, including requiring that synchronized data be limited to perhaps lower-fidelity representations that are supported by every endpoint, even when some endpoints may be able to provide additional functionality or operate with more complex and potentially more useful representations of the same data.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques and technologies directed to the modification of data on a synchronization endpoint without necessarily modifying data that is synchronized. In at least some implementations, the representation of data on an endpoint may be modified so that constraints on that particular endpoint are enforced, without requiring a similar or the same modification to the data when it is synchronized to other endpoints.

DETAILED DESCRIPTION

Figure 1:
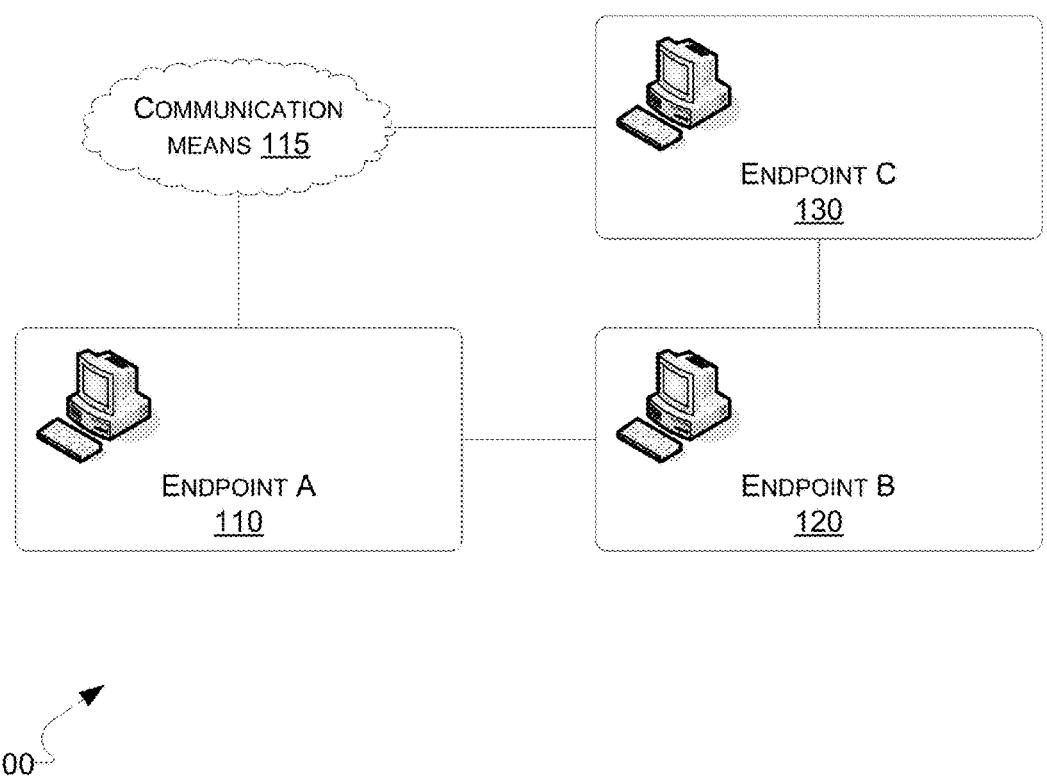
FIG. 1 illustrates an exemplary system in which data may be synchronized and shared.

Described herein are various techniques and technologies directed toward an implementation of data synchronization where data is modified on a synchronization endpoint, perhaps to ensure that constraints on the data on the endpoint are enforced, without necessarily modifying data that is synchronized. That is, for example and in at least some implementations, the representation of data on an endpoint may be modified so that constraints on that particular endpoint are enforced, without necessarily requiring a similar or the same modification to the data when it is synchronized, or when the data is accessed or used on other endpoints.

In some implementations, a synchronization system may be comprised of executable code that communicates data between multiple endpoints, such as between multiple computing devices of a wide variety of types. In just one example, a synchronization system might synchronize computer-implemented directories and files between different computers. Using such a system, a user might be able to keep a directory, and all files (and perhaps subdirectories) in the directory, synchronized between multiple computers. When a user changes a file in the synchronized directory, the modification or the changed file might be synchronized or transferred through a variety of means from the computing device on which the change was made to one or more other computing devices. When a user adds a new file, the new file might be similarly communicated, and so on. The same or one or more other synchronization systems might also synchronize any of a wide variety of other types of data.

In at least some implementations there may be one or more constraints associated with data that is synchronized. If such constraints are not followed or adhered to, the synchronized data may not be usable, may not be valid, may only be usable with limitations, and so on. For example, continuing with an exemplary directory and file synchronization implementation, it may be the case—on at least some endpoints—that the synchronized directories and files must conform to a variety of particular constraints. In just one of many possible examples a file may be required to be the "child" of a directory or may be required to be associated with a directory. Furthermore, the directory may be required to be valid itself—it may not be deleted, may not have an invalid name, and so on. Another exemplary constraint might require that a particular directory not contain two files with the same name. In a further exemplary constraint, two directories may not be allowed to be children of each other (which would form a "cycle"). That is, "directory A" may not be a child of "directory B" if "directory B" is a child of "directory A". In yet another example, directory names and file names may be required to use only characters selected from a particular set of characters. That is, perhaps, alphanumeric characters like "A", "B", "c", "d", "1", "5", and so on, might be allowed in a directory or file name while particular other characters—perhaps like "!", "%", or others—might not be allowed. Other constraints are also possible, both for an exemplary directory and file synchronization implementation as well as for any other type of data.

In some environments, such as on a single computing device, it may be considered relatively simple to ensure that at least some constraints are followed. However, in at least some other environments, including when data is synchronized between multiple endpoints and may be modified or changed on more than one endpoint, ensuring that all constraints are followed may be more difficult. As just one example, ensuring that a directory only holds one file with a particular name may be implemented on a single system by, for example, executable code associated with a file system. Such executable code may not allow a new file to be created when the new file has the same name as an existing file in the same directory, may not allow a file to be renamed to have the same name as an existing file, and so on.

However, in an environment where files in a directory are synchronized between computing devices and files may be added, modified, or deleted on more than one computing device, requirements—such as requiring that no duplicates exist—may not in at least some implementations be solely enforced by the file system on a particular computing device. In just one example of a case where multiple files may be created, a new file may be created on one computing device. At the same time, or at another time before the synchronization of data, another file with the same name may be created on a second computing device. In this example, until the two computing devices synchronize their data, the requirement that no duplicate files exist may not be violated. However, to fully synchronize the data would require that the file created on the second computing device be created on the first computing device. Performing this action would create two files with the same name in the same directory on the first computing device, which would violate the constraint that no duplicate files are allowed in the same directory. (The same problem would exist when the file created on the first computing device was synchronized to the second computing device.)

Another example of a potential issue where following constraints may be difficult may occur with the characters that are allowed as part of a directory or file name. For example, it may be the case that two or more endpoints that, say, use the same file system, may have the same constraints about the characters allowed in a directory or file name. That is, again for purposes of example, suppose two endpoints both run the same computer operating system and have storage that uses the same file system. A file created on one such endpoint may, as enforced by the file system or file systems in use on the endpoint, have a valid file name. If such a file is then synchronized to another endpoint that is subject to the same constraints for directory and file naming, again for example and without limitation, the file name may continue to be valid. However, the file name may not be valid if it is synchronized to, for example, an endpoint or computing device that uses some other operating system or file system that has different rules or constraints for valid file names. So, for example, a file name like "File!.txt" may be valid on one endpoint but not valid on another endpoint. In some cases, such a file may be created without problem on one endpoint but may not then be synchronized to another exemplary endpoint without violating at least some constraints associated with the synchronized data.

In at least some cases when constraints may be violated as part of synchronizing data, a variety of implementations or solutions may be used to, for example, attempt to resolve potential issues by ensuring that constraints are not violated or that violated constraints are resolved.

For example in some implementations it may be possible to determine that a constraint has been violated and, perhaps automatically or with the involvement of some entity like a user or some other executable code, resolve the violated constraint. Continuing with the previously introduced directory and file synchronization example, it might be possible in some implementations to automatically rename a directory or file that uses characters that are not valid on a particular endpoint. For example and without limitation, if a file that is created on a first endpoint with a file name that is valid on the first endpoint is then synchronized to a second endpoint where the file name is not valid, the file name might be changed on the second endpoint—in some cases automatically—so that the file name uses characters that are valid on the second endpoint. If files are kept in sync between the two endpoints, when the change to the file's name is synchronized back to the first endpoint, the file name may also be changed on the first endpoint to the same new file name. As a result the file name may be the same on both endpoints, and may be valid on both endpoints. However, the file name in such a case may now be limited to no longer including characters that are valid on the first endpoint, and so might not be as descriptive as it would be in the absence of the constraints associated only with the second endpoint.

Furthermore, in some cases different endpoints may have mutually exclusive constraints so that not even some subset of the data may be represented on both endpoints without violating the constraints associated with at least one of the endpoints. For example, a name that uses, say, characters used in the Hindi language may not share any characters with a name that uses characters used in the a form of the Chinese language, in the English language, and so on.

In some examples, the violation of a constraint may result in a synchronized item being flagged or noted in some manner. Such flagged or noted data might then be evaluated—perhaps by a user of the synchronized data, or some other entity—and then the violation of the constraint might be resolved through some means, including through action on the part of the user or entity. As another specific and non-limiting example using the same case of directory and file synchronization, if the synchronization of files would result in the creation of files with the same name in the same directory, one of the two files may be placed in a "holding area," such as a particular directory, or somehow distinguished from the other file so that the constraint is not violated. This action might then be noted with a "conflict" or other similar element of the synchronization system, and a user—perhaps a user of the synchronized files—might be notified through some means that such a conflict exists. For example, a user might see a dialog box, receive a "conflict email," or so on. The user might then be able to resolve the conflict through one or more actions, such as renaming one of the two files, moving one of the files to a different directory, deleting one of the files, and so on. When the user's change—a renamed file, a moved file, a deleted file, and so on—is then synchronized back to the first endpoint, both endpoints may then have the same set of files with the same names in the same directories, and so on, and the relevant constraints may not be violated.

While techniques such as those previously introduced may enable data to be synchronized without violating constraints, the techniques may also have limitations of their own. One potentially problematic limitation may be that changing data to ensure that constraints are followed may lead to a case where synchronized data is only able to take advantage of or use functionality that is common across or available on all endpoints. For example, even if one or more endpoints support directory or file names that use a wide variety of characters, those endpoints may not be able to use directories or files with many of those characters if directories or files are synchronized with another endpoint that only supports a more limited character set. In another example, while a requirement that no duplicate files exist may be common when files are located in a single file system, such a requirement may not be applicable in other representations of the same directory and file data. As one specific example of such a case, if a directory structure is represented, say, in a "web projection," using a web page—as HTML, for example—and users have the ability to download files by clicking links on the web page, files with duplicate names might be allowed because, in this representation, a "file" may just consist of HTML and a link, and there may be no reason why the HTML and links cannot include some duplication.

These kinds of limitations may also be problematic when improving, evolving, or generally changing the endpoints that synchronize data or the data that is synchronized. Limitations like these may reduce the ways in which a synchronization system can be improved or changed, or may reduce the endpoints that can participate in data synchronization. For example, while the initial endpoints that synchronize data might have the same or similar constraints—perhaps the first implementation of a system only runs on computing devices running a particular version of an operating system, say—at a later time it may be desirable to extend the synchronization system to run on one or more of a variety of other operating systems or types of computing devices. For example, rather than just running on "desktop" or "laptop" computing devices, it may be desirable to enable computing devices with perhaps less computing power that are correspondingly able to support perhaps less functionality—such as mobile phones—to participate in data synchronization. However, following new constraints required by the addition of such endpoints might then require that the data that may be synchronized be more limited in scope, in functionality, and so on. (Alternatively, it may not be possible to include the new additional endpoints in the synchronization system until the new endpoints include the functionality required to interpret and synchronize the full or original breadth of data synchronized between endpoints.)

Furthermore, in addition to possibly reducing the fidelity or capabilities of synchronized data, such changes might also require that all participating endpoints be modified to support the new requirements at the "same time" or before synchronizing with other endpoints. This may be required so that, for example, an older endpoint does not attempt to synchronize data to a new endpoint that cannot support or use the data. In some synchronization systems it may not be practical or possible to change or update all endpoints in such a fashion, and so updates that may be widely useful may in some cases not be made or may be made less frequently than would otherwise be desired.

In some implementations it may be possible to address at least some of these issues by a process of "realizing" "synchronization data" on to "domain data." As described herein, generally, realizing synchronization data on to domain data may be the process of mapping data that is synchronized, for example between endpoints, on to a representation of the data that may be used on a particular endpoint. "Synchronization data" would then comprise at least a portion of the data that is communicated between endpoints, while "domain data" would comprise a representation of the synchronized data as it is projected or exists on an endpoint.

As just one example, consider an implementation that synchronizes directory and file data by communicating XML documents between endpoints. In at least one example, such XML documents might be considered to comprise the synchronization data. In one non-limiting example, perhaps, directory and file metadata (such as a directory or file name, dates and times associated with a directory or file, and so on) might be represented in an XML document. In some cases, actual file data may be referenced from within the XML document but may not be transferred as part of the XML document itself. In other cases, file data may be included in the XML document.

In such an example, an XML document and any referenced file information might comprise the synchronization data, and might be realized on to actual file system objects or file system elements—such as actual directories and files—which in turn comprise the domain data. The process of realizing a synchronized XML document might be implemented, in part, by modifying (including creating, updating, and deleting) actual directories and files in a file system. That is, in at least some implementations, executable code might interpret the contents of a synchronized XML document and then create, update, delete, or otherwise operate on one or more directories and files. (It should be noted that generally, as used herein, phrases such as "modifying domain data" should be interpreted to include modifying existing domain data, and also to include other actions taken with respect to domain data, including creating new domain data and deleting existing domain data.)

In such an example, and in many other implementations and examples including those that do not synchronize directories and files or are different in other ways, at least some of the previously introduced problems, as well as other problems, may be addressed, at least in part, by the manner in which synchronization data is realized on to domain data. As just one example, to resolve an incompatibility arising from differences in supported characters for directory or file names, rather than modifying the directory or file itself (as it is represented in the synchronization data), the synchronization data might be realized on to a directory or file with a particular name when used with one file system, and realized on to a directory or file with a different name when used with another file system. That is, in just one non-limiting example, the directory or file name included in the synchronization data might be realized on to a directory or file and used as part of the domain data when the directory or file name is valid for a particular file system. However, when the directory or file name included in the synchronization data is not valid for a particular endpoint, the directory or file name might be realized on to a directory or file with a different name that is valid for that particular endpoint.

Furthermore, in at least some implementations, when the domain data changes—that is, in the preceding example, when the actual directory or file changes—and the change is to be synchronized to other endpoints, the domain data may be mapped back on to synchronization data in such a way that in at least some cases the changes to the data made as part of realizing the synchronization data on to the domain data are not transferred, synchronized, or visible to other endpoints. For example, suppose that due to the process of realizing synchronization data on to domain data that a file has a name that is different from the name specified in the associated synchronization data. A change to that file—say, a change to the contents of the file—may need to be synchronized to other endpoints. However, the change in the file's name—that is, the change made when during the realization process—might not be synchronized along with the updated file data. Instead, as part of generating synchronization data for the file, it may be determined that the file's name is different because of the realization process. In such a case, for example and without limitation, the original name specified in the synchronization data might be used as part of the generated synchronization data instead of the name of the file on disk (or in memory) on the particular endpoint. A variety of similar or other mechanisms for mapping domain data on to synchronization data may also be implemented, and are described elsewhere herein in more detail.

Generally, and stated differently, one difficulty that may arise when implementing a synchronization system may be ensuring that the data synchronized between endpoints "converges" to the same state on different endpoints. That is, although a change made on a particular endpoint may result in the data on one or more endpoints being different for some period of time, such a change should be communicated between synchronizing endpoints in such a way that, eventually, all endpoints will have the same change and converge to the same state.

Constraints that exist on one or more endpoints may make converging to a common state more difficult. For example, recall the previously introduced example where an endpoint may synchronize a file from another endpoint that has the same name as a file that already exists on the endpoint. If used with a file system that does not allow files with the same name to exist in the same location, an endpoint might attempt to resolve the potential issue by renaming one of the files. The renamed file may then be synchronized to other endpoints. However, if more than one endpoint changes the name of the same file independently, a situation may arise where changes to the file's name are made repeatedly on multiple endpoints, and the changes may diverge and not reach a common state, instead of converging to a common state.

In some implementations, such problems may be addressed, at least in part, by separating the synchronization data from the domain data and then realizing the synchronization data on to the domain data, as described herein. In such implementations, the synchronization data may not be required to adhere to the same constraints defined or required for the domain data. This, in turn, may make it easier for the synchronization data to converge to common state on all endpoints. The process of realizing the synchronization data on to domain data may then be used as part of applying the constraints required by the domain data, and as part of communicating at least some changes to the domain data using updated synchronization data.

Finally, it may be useful to understand that, in at least some implementations, the existence of at least some problems including those introduced previously and described herein may be more common with synchronization techniques that are designed to be relatively more "generic," in that the synchronization techniques are designed to operate on a wide variety of data of different types. That is, it may in some cases be possible to include specific processing for constraints associated with particular types of data in synchronization systems that operate to synchronize only particular types of data. However, it may be more difficult or less desirable to include such specific processing with generic synchronization techniques that may synchronize a wide variety of data types. As a result, techniques such as those described herein, including mapping between synchronization data and domain data, may provide benefits that are especially useful when used with generic synchronization techniques.

Turning now to FIG. 1, shown therein is an exemplary system 100 in which data may be synchronized and shared. The exemplary system 100 contains endpoint A 110, endpoint B 120, and endpoint C 130, as well as the exemplary communication means 115. This description of FIG. 1 may be made with reference to other figures. However, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist.

Generally, a sharing or synchronization relationship may exist between two or more endpoints. A particular sharing relationship may generally relate to a set of data comprising one or more data items, or simply items. When at least some kinds of changes are made to an item, the changed item or just the change itself might be synchronized to the other endpoint (or endpoints) in the synchronization relationship.

While synchronization of data may be implemented in a wide variety of fashions and using a variety of techniques and technologies, in at least some implementations, synchronization of data may be implemented, at least in part, by the addition of particular data to a feed of data provided using a possibly widely accepted protocol like RSS ("Really Simple Syndication" or "Rich Site Summary") or Atom. For example, in an exemplary implementation with a topology that consists of only two endpoints that communicate with each other, a publisher—such as perhaps endpoint A 110, in at least one example—might publish an RSS or Atom feed that contains some type or types of information. In perhaps one example, the feed might include data representing directories and files. In yet another example, the feed might represent, contain, or reference any other data.

A subscriber, such as perhaps endpoint C 130 in one example, might subscribe to the feed provided by the first endpoint and be notified when, for example, the first endpoint adds a new file, modifies an existing file, and so on. In addition, a subscribing endpoint might publish its own feed, with the same data as is provided in the original publisher's feed and also with changes or additions made by the subscriber. The original publisher might then subscribe to this second feed. Through these mutual subscriptions, changes made by either endpoint may be reflected in the data maintained by both endpoints. Furthermore, multiple endpoints may participate and share the same data by subscribing to at least one of the feeds provided by another endpoint and similarly publishing their own feed.

In at least some implementations, the synchronization information in a feed, and the processes to be followed by at least particular endpoints when exchanging data, may be the same as or similar to those associated with a protocol such as "Simple Sharing Extensions" (SSE). SSE may be understood generally as defining extensions to—or additional data to be used with—feed protocols like RSS and Atom, or other feed protocols or documents, where the extensions relate to information that may be used when transferring or synchronizing data using a feed. In some cases, an RSS, Atom, or other type of feed that includes SSE information may be referred to as an "SSE feed."

A protocol such as SSE, or another synchronization protocol, may also define procedures to be followed by endpoints so that the synchronization information in a feed conforms to a particular organization and, as a result, may be read and used by other endpoints in synchronization relationships. As just one example, SSE specifies particular synchronization information that may exist for an item in an SSE feed. When a new item is created, an endpoint may be responsible for ensuring that the appropriate SSE information is associated with the new item and that the SSE information is provided in the correct location in the feed, uses the correct identifying names, and so on. A protocol like SSE might also define other procedures that require particular data to be included when, for example, an endpoint modifies an existing item, deletes an existing item, incorporates changes from other endpoints, and so on.

In a sharing relationship where both endpoints publish and subscribe, each endpoint may make "local" changes to items, where a "local" change may be a change made on the particular endpoint for some reason, including changes made by entities such as users, automated processes, and so on. Then, so the items being shared are kept the same on both endpoints, the local change may be published as part of the feed. Another endpoint may maintain its own set of the same items and, because it subscribes to the feed, may "merge" the changes exposed using the feed with the set of items that it maintains. The other endpoint may also make local changes of its own, which may then, after being published, be merged or incorporated by the first endpoint.

As one specific example, endpoint A 110 (or endpoint B 120, or some other endpoint including those not shown) might participate in a sharing or synchronization relationship with, say, endpoint C 130. Endpoint A might make, say, an Atom feed available that contains item data and feed synchronization data. Endpoint C might access this feed, incorporate or merge changes in the feed into its own store of items, and in turn make its own feed available. Endpoint A might then subscribe to the feed provided by endpoint C and merge changes made by endpoint C.

In some implementations, an endpoint in a sharing or synchronization relationship might itself generate or update a feed used in a synchronization relationship. For example, a user might use an application that is associated with endpoint A 110 to modify some data that is in turn being shared and synchronized by endpoint A, perhaps with endpoint C 130. In order for the change made by the user to be made available to endpoint C, endpoint A might need to update the feed with the changed item information, as well as with changed feed synchronization information. In an implementation that uses SSE, the feed synchronization information in the feed might be updated, for example, by modifying an XML document that embodies the feed by, among other things, updating a particular "version" attribute with a new version number, by modifying an update history associated with the item by creating new XML elements, and so on.

As used herein, synchronization data may generally comprise data exchanged, transferred, or communicated between endpoints. In one specific and non-limiting example, when a protocol like SSE is used to synchronize information between endpoints, the synchronization data may comprise a feed that includes SSE information. Such a feed might itself comprise one or more feed items (or feed data items), which may in some cases be referred to as "synchronization data items." In other implementations, synchronization data items (and synchronization data in general) may be represented in a variety of other ways, including without the use of SSE.

In some implementations, not all endpoints must both publish a feed and subscribe to a corresponding feed. For example, some endpoints may only publish, but not subscribe, to a feed related to some particular set of data. Such endpoints may publish information about local changes made by that endpoint, but may not incorporate changes made by any other endpoint. Any other arrangement of publishing and subscribing actions may be contemplated or implemented depending on the requirements of the particular scenario or situation. Also note that, in some implementations, a particular set of two endpoints might have more than one sharing relationship if they share more than one set of data. In other implementations, a sharing relationship might be defined to include all of the data shared between two endpoints, even if it includes more than a single set or type of data. Furthermore, while in some implementations a sharing relationship might exist between two endpoints, it may also be possible for a particular set of items to be shared and synchronized with any number of endpoints. This may be accomplished through a variety of arrangements or topologies of endpoints. As just one example, a set of some number of endpoints might synchronize with a particular endpoint, and that particular endpoint might then synchronize with one or more additional endpoints that do not synchronize information directly with the original set of endpoints. In at least some of such cases, or other cases, information may be synchronized throughout the entire "mesh" of synchronizing endpoints.

Endpoint A 110 and endpoint C 130 are shown in the system 100 as being connected by an exemplary communications means 115. Such an exemplary communications means should be interpreted as including any means by which data may be transmitted, including any type of network or any other kind of transfer, including the transfer of physical media, like a compact disc (CD) or flash memory drive. Endpoints might also be connected directly, such as might be illustrated, for example, by the connection between endpoint A 110 and endpoint B 120.

The information that is shared and synchronized between endpoints may be stored in a variety of manners and locations. In at least one implementation, an endpoint might store synchronized data locally on the same computing device or remotely on one or more other computing devices. Such storage may in some cases be embodied by one or more disk drives or magnetic or other storage devices, or by any other mechanism by which data may be stored. When some or all of the synchronized data is accessed remotely, the data may be accessed, for example, using a network or other communication means.

In some implementations, an endpoint might store data that is shared using a data store such as a computer-implemented database, or other storage mechanism, and might generate a feed dynamically or at particular times. In the same or other implementations, an endpoint might store a feed itself by storing a file in a file system—perhaps by storing an XML file in the case of an RSS feed, and so on.

Each endpoint shown in this system might represent any number of general-purpose or dedicated computers, including desktop computers, server computers, laptop computers, workstation computers, mobile or cellular telephones, connected personal digital assistants (PDAs), and the like. In at least some implementations, an endpoint may be implemented by a computing environment including the exemplary computing environment discussed below with reference to FIG. 5.

Figure 2:
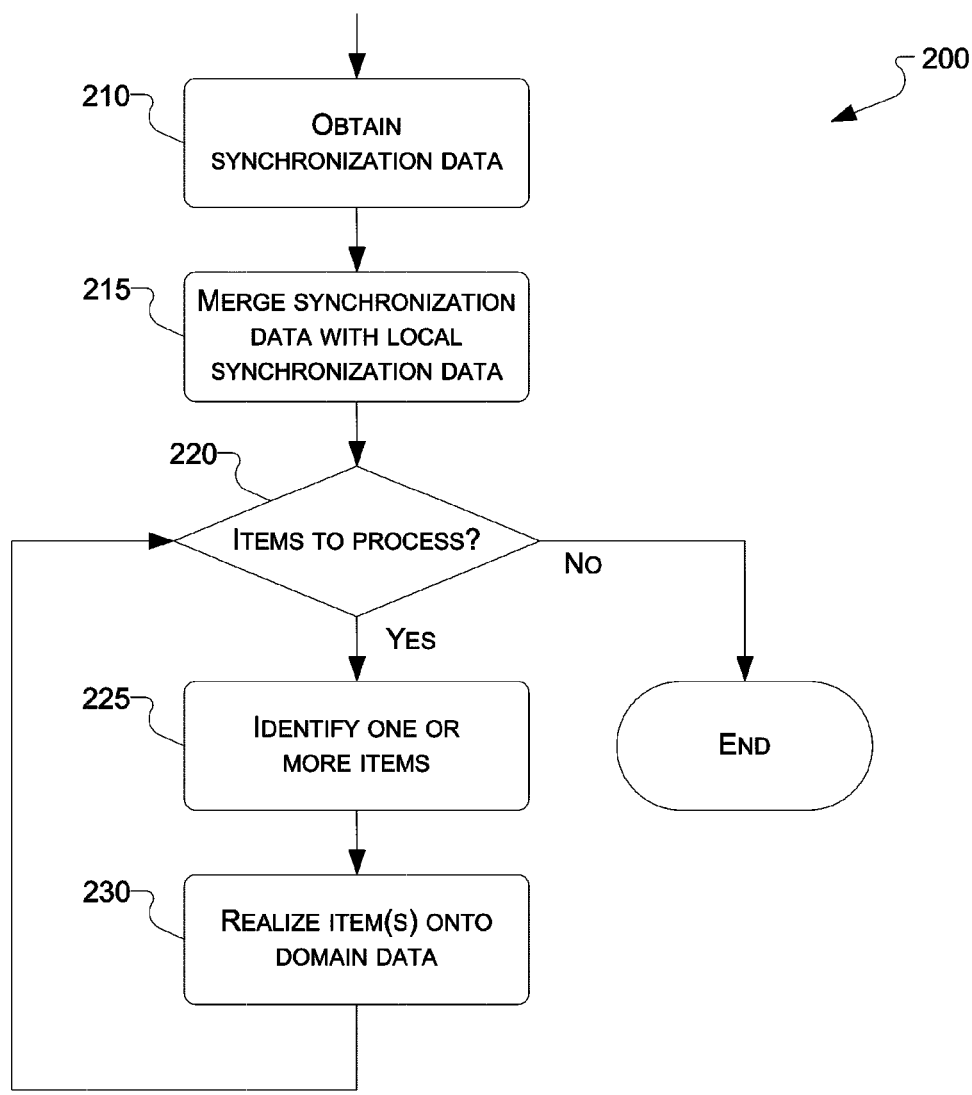
FIG. 2 illustrates an exemplary generalized operational flow including various operations that may be performed when incorporating synchronization data on an endpoint, including realizing synchronization data on to domain data.

Turning now to FIG. 2, shown therein is an exemplary generalized operational flow 200 including various operations that may be performed when incorporating synchronization data on an endpoint, including realizing synchronization data on to domain data. The following description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 210, synchronization data may be obtained from some location, including another endpoint, through a variety of means. For example, in an implementation that uses one or more feeds of synchronization data, such as an implementation that uses SSE, at least part of one implementation of operation 210 might comprise the retrieval of a feed document that includes item information as well as feed synchronization (or feed sync) data elements. Such a feed document might be retrieved by the endpoint that executes at least some operations of the exemplary operational flow 200 by, for example, executing an HTTP GET request, or through some other network or other data retrieval operation. In the same or other embodiments, the synchronization data might be delivered or provided to the endpoint. In some implementations, the synchronization data might be represented by a feed like the incoming feed 422 or incoming feed N 424, both of which are described below with reference to FIG. 4.

In at least one implementation of operation 215, the obtained synchronization data, including data that might have been obtained by executing operation 210, may be incorporated or merged with synchronization data that is maintained by the endpoint. In at least some implementations the merging of the obtained external or foreign synchronization data with the local synchronization data may be performed using one or more synchronization techniques. Such techniques might in some implementations identify at least some potential synchronization issues. For example, one type of issue that might be identified might occur when multiple endpoints have modified a particular item independently and further review or processing might be necessary so that, for example, a change made on one endpoint is not overwritten or lost when a change on another endpoint is saved. A merge operation might be in some implementations be performed by or associated with a synchronization module that is the same as or similar to the synchronization module 420, and might result in the incorporation or merging of incoming synchronization data with synchronization data already stored or made available using a synchronization data storage module 430, both of which described below with reference to FIG. 4.

For example, in an implementation that uses SSE, at least one implementation of operation 215 might comprise merging an incoming feed with a local feed using SSE techniques for merging feeds. For example, in some exemplary implementations, the synchronization data obtained as part of operation 210 might be a "foreign feed," the item updates performed locally might operate on a local store of feeds maintained using something like a synchronization data storage module 430, and so on. For example and without limitation, in at least one implementation, a locally maintained feed document might be updated during the execution of operation 215 so that the locally maintained feed document incorporates at least some of the changes represented or embodied in an incoming or foreign feed.

While operation 215 might in some implementations merge synchronization data and perform at least some additional processing, like identifying conflicts that can be determined using the feed synchronization data in a feed, in at least some implementations particular other operations may not be performed as part of operation 215. One operation that may not be performed in at least some implementations of operation 215 may include the process of realizing the synchronization data on to domain data, which might in at least some of such implementations be performed by other operations in the exemplary operational flow 200, including operation 230.

After an implementation of operation 215 has completed, changes or modifications embodied in the synchronization data obtained from another endpoint may be considered to have been incorporated and reflected in the local synchronization data. That is, for example, a change to an item that was made on another endpoint and communicated in the synchronization data obtained in operation 210 may now have been incorporated into the corresponding local synchronization data. As just one specific example, if the synchronization data obtained in operation 210 represents directories and files and a change to an existing file was represented in the obtained synchronization data, the execution of operation 215 may have incorporated the change into a local representation of the synchronization data. Similarly, other functionality provided by the synchronization protocol or techniques that are used to merge data may have been exercised. For example, if the merging process can determine when an item has been modified independently on multiple endpoints—a capability possessed by SSE, in at least some cases—such an item may have been identified or marked. For example, in implementations that use SSE, such an item might have been identified as an SSE conflict.

However, while the local synchronization data has been updated, such data may not yet have been realized, mapped, or otherwise used to update the corresponding domain data, including domain data that a user, process, or other entity might typically use. In the example of synchronizing directory and file information, while a local synchronization data representation of the directory and file information may have been updated—so that changes to existing files, say, are now represented in the local synchronization data—those changes may not yet have been realized on to, say, the domain data of actual file system objects or file system elements such as directories and files.

Therefore, in at least one implementation of operation 220, it may be determined if there are any synchronization data items left to process as part of realizing synchronization data items on to domain data items. If there are items left to process, the exemplary operational flow 200 may proceed to operation 225, described below. If there are no more items to process, the exemplary operational flow may end. In at least some implementations, during the first execution of operation 220, all of the data items represented in the local synchronization data may not yet have been processed. For example, in an implementation that uses SSE and where, say, 10 data items are represented in the local synchronization data, there may be 10 items left to process when operation 220 is first executed. In other implementations, only particular items selected from the local synchronization data may be identified for processing, through the use of a variety of filters or other means. In some implementations, during subsequent iterations of operation 220, previously processed items may be considered to no longer require processing. In the same or other implementations, items that have already been processed may be determined to require additional processing—that is, for example, an item may in some cases be processed more than once. Synchronization data Items may be determined to require additional processing for a variety of reasons, including as a result of or as part of realizing the same or other synchronization data items onto domain data items.

In at least one exemplary implementation of operation 225, one or more items in the local synchronization data may be identified as items that will be further processed in a subsequent execution of operation 230. In some implementations, only a single item may be identified at a time. In other implementations—including those that might realize multiple synchronization data items on to a single domain data item—more than one synchronization data item might be identified when operation 225 is executed.

As just one example, in one implementation that synchronizes directory and file information, each time operation 225 is executed a new directory or file in the local synchronization data might be identified. In the same or other directory and file implementations, multiple items might be identified in some executions of operation 225. For example, when a directory is identified one implementation of operation 225 might also identify or attempt to identify the files that are located in the directory. This might enable, for example, files to be realized on to domain data when their parent directory is also realized on to domain data.

Finally, in one or more implementations of operation 230, the synchronization data item (or items) identified in operation 225 may be realized on to one or more domain data items. Generally, one or more synchronization data items may be realized on to one or more domain data items by creating or modifying the associated domain data item(s) using at least some information included in the synchronization data item(s). The implementation of operation 230 and the specific manner in which a domain data item is created or modified, or how or what data associated with a synchronization data item is used, may generally depend, at least in part, on characteristics of the synchronization data item and domain data item. Furthermore, in at least some implementations, operation 230 may be implemented, at least in part, by a realization module, such as the exemplary realization module 440 or realization module 442, both described below with reference to FIG. 4.

As just one example, consider the case where a synchronization data item represents a file, the synchronization data item comprises text that describes file metadata and is located in an XML feed document (which might also include SSE information), and the contents of the file are also located in the XML document (perhaps when the contents are text) or are represented as binary data and are located in some other location referenced by data in the feed document. In such a case, in at least some implementations, the domain data item that corresponds to this synchronization data item might be an actual file in a file system. In such an example, realizing a synchronization data item on to a domain data item might involve creating a new file—perhaps using an application programming interface (API) provided by a file system or operating system—that has the file metadata and contents provided in or referenced by the synchronization data item. If such a file already exists, realizing the synchronization data item might involve updating the information associated with the file—including the file metadata or the file contents—so that the file is consistent with the synchronization data item. For other types of data, other synchronization data representations, other domain data items, and so on, realizing a synchronization data item on to a domain data item may proceed differently.

While such realization steps may be sufficient in at least some cases, in other environments additional processing may be necessary to realize a synchronization data item on to a domain data item. Such other cases might include environments—including environments in at least some examples introduced or discussed previously—where there is a difference between the functionality, support, or representation associated with synchronization data and the functionality, support, or representation associated with domain data. For example, just one example of such a difference, again as previously introduced, might be when the set of valid characters allowed in synchronization data is different from or larger than the set of valid characters allowed in the corresponding domain data.

When such differences exist, there may be a need to do more than simply transfer or copy elements of a synchronization data item to a corresponding domain data item. For example, in some cases information from the synchronization data item may need to be modified so that the corresponding domain data item is valid.

Furthermore, such modification of the data may need to be performed in such a way that the synchronization data item is not modified, and will not be modified when changes to the domain data item are later used to update or generate a new synchronization data item for use when synchronizing changes to other endpoints. Changing the domain data item in such a way may make it possible, for example, for other endpoints to fully use the synchronization data even when a particular endpoint may only support, for example, a more limited representation, more limited functionality, and so on.

One manner in which the domain data may be modified without modifying the synchronization data, either at the time the domain data is modified or later when synchronization data is generated for communication to another endpoint, might use some kind of data structure that records how the domain data item was modified or changed, for a particular synchronization data item or items. Such a data structure may then be used later when generating synchronization data, perhaps to identify the original synchronization data item (or items) or to "reverse" a change or changes that are made as part of realizing the synchronization data on to domain data.

As just one example, consider again the case where the synchronization data represents directories and files, and one or more of a variety of limitations or incompatibilities exist on a particular endpoint. In such an example, part of realizing directory and file synchronization data on to a domain data representation might involve determining if the synchronization data is in some way incompatible with or violates constraints required by a domain data representation, and if so, modifying the domain data item or items, and recording what modification or modifications were made. Specifically, for example, suppose that a file communicated in the synchronization data has a name that uses characters that are not supported on a particular file system. Part of realizing such a synchronization data item might involve, for example, creating an actual file that has a different name, and recording how the domain data item—the file, again—was changed. Such recorded data may then later be used, for example and as described below in more detail with reference to FIG. 3, as part of determining how to generate or update a synchronization data item for communication to other endpoints.

As previously introduced, when realizing synchronization data on to domain data, a variety of modifications to the domain data may be determined to be necessary, depending on characteristics associated with the synchronization data, the domain data, the endpoint or endpoints on which realization may be performed, and so on. When one or more modifications are necessary, part of realizing the synchronization data on to domain data may include modifying the domain data to resolve such incompatibilities, to enforce constraints, and so on.

In the example of directory and file synchronization data, and in a variety of other examples, additional situations may arise during realization where the domain data may need to be modified. At least three of these situations may arise when the domain data comprises information that is organized in one or more hierarchies, but where, in at least some implementations—including those that use some forms of SSE—the synchronization data consists only of a "flat" list of data without an inherent notion of hierarchy. In such an environment, or in other environments, one manner in which a hierarchy may be represented might use one or more additional fields of data on each synchronization data item to store the "parent" of the item. With such an implementation, the synchronization data for a file that is located in a directory might have data in a particular data field that contains, for example, the name of the directory, the ID of the directory, or some other information that enables the inference of a hierarchical organization from a non-hierarchical data representation.

While such an implementation may enable the representation of hierarchical data, it may also be possible for inconsistencies, incompatibilities, or other cases to occur that may necessitate the modification of domain data when realizing synchronization data on to domain data. These problems may include orphans, duplicates, cycles, or other issues. In general, these problems may be specific examples of at least some of the issues that may arise when the underlying synchronization techniques—such as those that merge synchronization data, as in operation 215—exist independently of the meaning or use of the data that is being synchronized. That is, these issues may exist in at least some implementations when the underlying synchronization techniques do not necessarily support or have knowledge of the domain-specific relationships that exist in the domain data. As previously explained, in general, at least some of these kinds of problems may be resolved by modifying domain data when realizing synchronization data on to domain data.

For example, in some implementations at least, a file in a file system may be required to be located in a directory, and so may be required to have a "parent." A file (or directory) that does not have a parent may be considered to be an "orphan." While an operating system may prevent the creation of orphaned files or directories when a user or process interacts directly with file system objects, it may be possible for orphans to be created when synchronizing directory and file information. For example, suppose that one user adds a file to a directory while another user—on another endpoint and before synchronizing the newly added file—deletes the same directory. If the second user then synchronizes and so receives the newly added file, the newly added file will be an orphan, because its parent directory no longer exists on the second endpoint.

A problem with orphaned file system objects may be resolved in a variety of ways. In one example, the orphan file may be moved when its synchronization data is realized on to domain data so that the domain data item—the actual file—is placed or located in a "holding area" or some specific location in the file system, such as a specific directory. Such a change might be made only from the perspective of the endpoint that realizes the synchronization data. That is, the synchronization data itself may not change, and, from the perspective of other endpoints that use the same synchronization data, the directory might still be deleted and the newly added file might still exist. Furthermore, a different realization process—say, perhaps a realization process used with a web projection that stores files in a flat list in a database and only uses directories as names with which to tag files—might not consider the lack of a parent directory to be an issue or problem at all.

In some examples, such as an example where the domain data comprises an actual file system, or with other types of domain data, the user might also be notified that the particular file is orphaned. The user might then be able to take some specific action—such as moving the file to a directory that has not been deleted, deleting the file, and so on—that possibly definitively resolves the incompatibility. Such an action taken by a user might generally be considered a local change made to domain data, and as such, the change (or the changed domain data), might then be included in updated synchronization data and synchronized to other endpoints (as explained in more detail with reference to FIG. 3, below).

Another potential issue may arise when, for example, a file with the same name that is located in the same directory is created on multiple endpoints. When such a file is synchronized, the synchronization data might then indicate that files with the same name exist in the same directory, which is not allowed by many file systems. (However, as with the example of orphaned files, files with the same name may not be an issue with some types of domain data.) In the case of a file system realization, a problem of duplicate files may be resolved in a variety of ways. In one example, one of the duplicates might be chosen in some manner—perhaps by choosing the item with the higher SSE identifier—and then be moved to a holding area, like a specific directory. As a result, the file system might then contain one file in the original directory and another file with the same name in another directory. Furthermore, as before, a user, process, or other entity might then be able to evaluate the files and determine if any further action should be taken. Such actions might include renaming one or both files, moving one or both files to different locations, deleting a file, and so on. And finally, like before, such a user modification to the domain data might then result in at least some implementations in the modification of the corresponding synchronization data and the synchronizing of the change or changes to other endpoints.

Yet another potential file system issue is that of "cycles," when one directory, such as, for example, "directory A," is made a child of, say, "directory B," on one endpoint, while at the same time—or at least before the two endpoints synchronize data—"directory B" is made a child of "directory A" on another endpoint. A file system may require that all file system objects or file system elements in a file system hierarchy ultimately descend from a root object or element, and a cycle violates this requirement. One way to resolve this incompatibility might be to move the file system objects that comprise the cycle to a holding area or special directory. As before, a user might be notified of this change and then be able to definitively resolve the problem, perhaps by relocating the file in the holding area.

In another file system example, some file systems may enable a file to include multiple or alternate "streams" or sets of data, instead of just one stream or set of data. Without a process for operating with files that include alternate streams, a synchronization system might be implemented so that it only supports files with a single stream of data—files that also contain alternate streams would not be allowed. However, in an implementation where synchronization data is realized on to domain data, files with alternate streams may be supported or synchronized even with endpoints that do not natively support such files. For example, on endpoints that support files with alternate streams, only a single file—also containing the alternate stream—might be created. However, on an endpoint that uses a file system that does not support alternate streams, alternate stream information in the synchronization data might be realized on to additional and separate files. (Further, when generating synchronization data, as described below with reference to FIG. 3, the additional and separate files might be used to generate synchronization data that represents a single file with alternate streams.)

It should be noted again that while many of the previous (and subsequent) operations and other elements have been explained with reference to specific examples that discuss the synchronization of directories and files between endpoints, the techniques described herein are not limited to such implementations and are suitable for a wide variety of other uses, including for the synchronization of a wide variety of other types of data.

As just one example of another type of synchronization data and domain data, a content management or web log (blog) system might synchronize top-level articles or posts, as well as comments made about each article or post. In such an example, the text of a post or comment might be represented, say, as an item in an RSS feed that might use SSE. Furthermore, a variety of constraints might exist between, for example, articles and comments. For example, at least when represented in a user interface, every comment might need to be associated with a top-level article or post. When synchronization data is realized, then, comments that are not associated with a top-level article or post might be flagged for further review and might perhaps not be displayed.

Another example of a synchronization system where the realization of synchronization data on to domain data might be useful may include an exemplary system that synchronizes information in one or more particular languages. In such an implementation, part of realizing such synchronization data on to domain data on endpoints that use some other language might include translating information from one language to information in another language. Similarly, information provided in some other language might be translated during a realization process to information in the first language. As just one specific example of such an implementation, a user might create a document using the Hindi language. The document might be synchronized to some another endpoint operated by a user that reads the English language. As part of the process of realizing the document on to the second user's endpoint, the information in the document might be translated from Hindi to English. Perhaps in the same implementation, a document created by the second user, with information in English, might be synchronized to the first user. Then, as part of realizing the document on the endpoint of the user that reads Hindi, the information in the document might be translated from English to Hindi.

Figure 3:
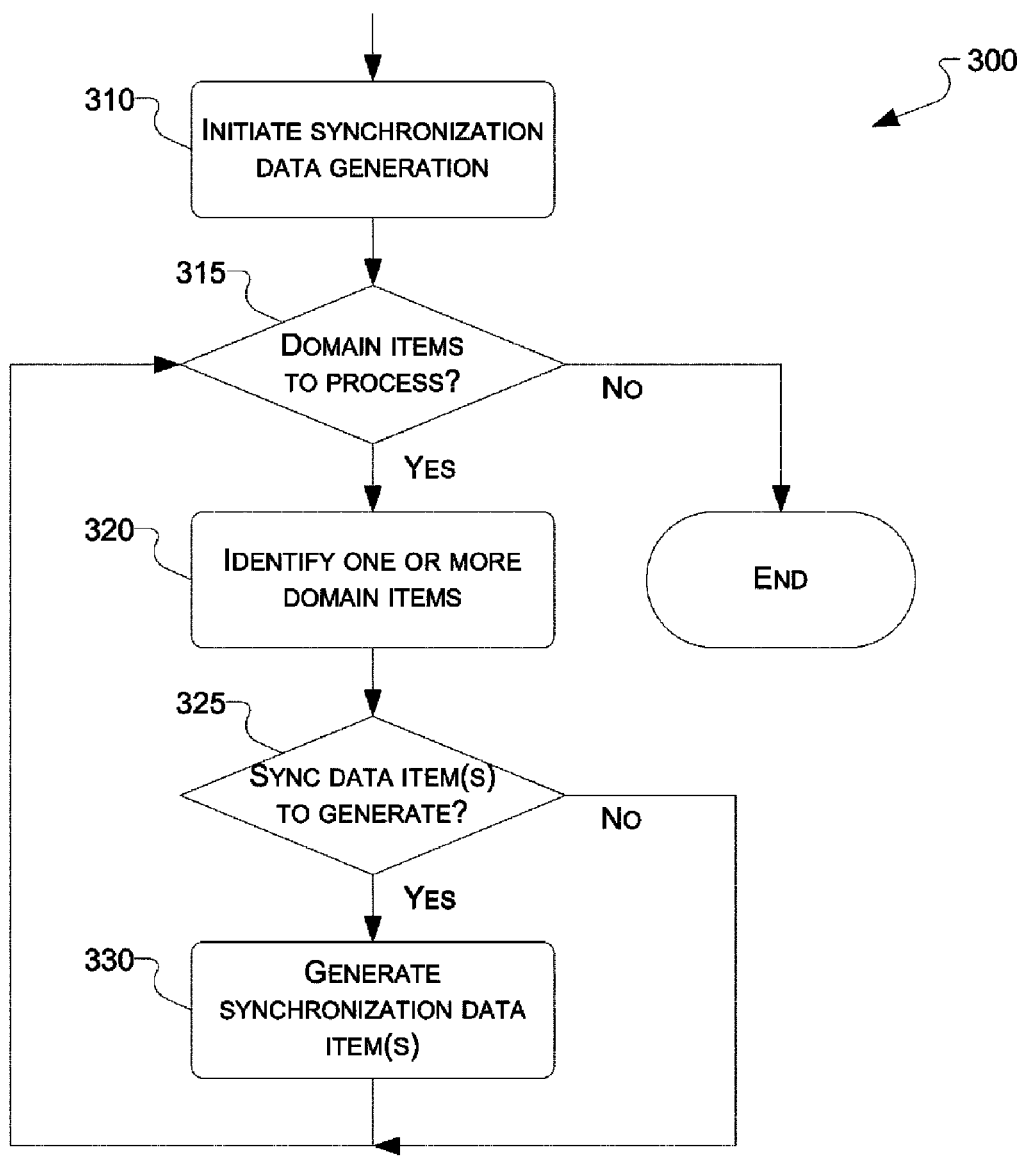
FIG. 3 illustrates an exemplary generalized operational flow including various operations that may be performed when generating synchronization data for communication to other endpoints, including generating synchronization data using previously realized domain data.

Turning now to FIG. 3, shown therein is an exemplary generalized operational flow 300 including various operations that may be performed when generating synchronization data for communication to other endpoints, including generating synchronization data using previously realized domain data. The following description of FIG. 3 may be made with reference to other figures. However, it should be understood that the operational flow described with reference to FIG. 3 is not intended to be limited to being used with the elements described with reference to these other figures. In addition, while the exemplary operational flow of FIG. 3 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

The operations described previously with reference to FIG. 2 explain how synchronization data obtained, for example, from another endpoint, may be incorporated into local synchronization data and then realized on to domain data items. Such operations may make it possible for a particular local endpoint to use changes made on another endpoints. However, the operations described with reference to FIG. 2 do not, taken in isolation, make it possible for other endpoints to update their data with changes to domain data items that have been made on the local endpoint. For example, again using a non-limiting directory and file example, suppose that a user updates a file, perhaps by opening the file in a local application, making changes, and then saving the file. At some subsequent point in time it may be useful to generate an updated feed that reflects the change in the file so that other endpoints may then be able to incorporate the change into their own local copy of the file. One use of the exemplary operational flow 300 may be to assist in accomplishing this goal by generating synchronization data that may then be synchronized to other endpoints.

In an exemplary implementation of operation 310, the generation of synchronization data suitable for communicating or making available to other endpoints may be initiated for one or more of a variety of reasons. In some implementations, new synchronization data may be periodically generated after some interval of time has passed. In the same or other implementations the generation of new synchronization data may be initiated when one (or more) domain data items have changed locally, or may be initiated for some other reason.

In at least one exemplary implementation of operation 315, it may be determined if there are any domain data items left to process. If there are domain data items left to process, the exemplary operational flow 300 may proceed to operation 320, described below. If there are no more items to process, the exemplary operational flow may end. In some implementations, all domain data items may be processed by the exemplary operational flow 300, while in other implementations only some subset of domain data items—perhaps only those that have changed, or only those that have changed or are related to those that have changed, for example—may be processed.

In an exemplary implementation of operation 320, one or more domain data items may be identified to be considered for use when generating updated synchronization data. In some implementations, each domain data item may be considered individually and so only a single domain data item may be identified during each execution of operation 320, while in other implementations more than one domain data item may be identified and then possibly be considered together with other identified domain data items.

In at least one implementation of operation 325, it may be determined if it is necessary to generate any synchronization data items for the domain data item(s) identified in operation 320. If generating one or more synchronization data items is necessary (or may be necessary, but the determination cannot be made during this operation), then the operational flow may proceed to operation 330. If no synchronization data items are needed, the operational flow may proceed to operation 315. Whether one or more synchronization data items are needed may be determined in a variety of ways. For example, in an implementation where all domain data items are processed, this determination may be made, at least in part, by determining if the identified domain data item(s) have been modified since they were last synchronized. If so, then it may be necessary to generate a synchronization data item or items so that the modification made locally may be made available to other endpoints. For example, if a domain data item—such as an actual file—has been updated or changed, this operation may determine that a synchronization data item, or multiple synchronization data items, should be generated for the domain data item.

In some implementations, a modification made as part of realizing a synchronization data item on to a domain data item—such as might have been implemented, for example, by an exemplary operation 230 described previously with reference to FIG. 2—may not comprise a change that would result in the generation of new synchronization data. That is, for example, a new synchronization data item may only be necessary when a change has been made to a domain data item by a user or other entity. Considered from another perspective, it may be understood that the modification of a domain data item as part of realizing synchronization data on to a domain data item may in some cases only result in a change that to the domain data item itself. Such a change may not be visible to other endpoints or be synchronized to other endpoints, and so may not require that new synchronization data be generated.

Finally, in at least some exemplary implementations of operation 330, one or more synchronization data items may be generated for the domain data item or items that may have been identified, for example, in operation 320. In some cases, such as where the identified domain data item was not modified as part of realizing synchronization data on to the domain data item, this operation may be implemented by using the data associated with the domain data item to generate a corresponding synchronization data item. Changes made locally on the domain data item would then be reflected in the generated synchronization data, and could be synchronized or communicated to other endpoints. For example, when a domain data item embodied by an actual file has been updated by, say, a user of the file on the local endpoint, such a change might be reflected in a newly generated or updated synchronization data item. In implementations that use SSE and feed documents, this synchronization data item might be generated, at least in part, by performing an SSE update operation that might, for example, involve updating the item information in the synchronization data item to include the change to the file as well as updating a version identifier associated with the synchronization data item.

In cases where the domain data item or items being considered were modified as part of realizing synchronization data on to the domain data item, at least some exemplary implementations of operation 330 may also determine how the generated synchronization data should reflect the original received synchronization data and perhaps not necessarily the data comprised by the domain data item. That is, changes made as part of realizing the synchronization data on to domain data might only be visible locally on a particular endpoint, and may not be synchronized to other endpoints. Instead, the data synchronized to other endpoints might be the data originally received from other endpoints (except for any changes made locally after the domain data is realized).

In some implementations, data recorded when realizing synchronization data on to domain data may be used to determine if a particular local change should be included in generated synchronization data. Such recorded data might also be used as part of generating a synchronization data item—for example, it might replace or be used instead of data associated with a change made when realizing the domain data item on to a synchronization data item.

For example, consider again the case where a file name was modified during realization so that the actual file has a file name that conforms to the requirements of a particular file system. In such an example, the domain data item being considered when generating a synchronization data item might have a different file name than the file name that was originally received or that exists in the stored synchronization data. If this different file name had been the result of a change made to the domain data item (the file itself) by a user, process, or some other entity, then the change might need to be synchronized to other endpoints and so be part of the generated synchronization data item. However, in the case where the file name was changed as part of realizing the synchronization data item on to the domain data item, the change might not be made a part of the generated synchronization data item. Instead, for example, the original file name communicated and stored in the local synchronization data might be used as part of the updated synchronization data item.

Figure 4:
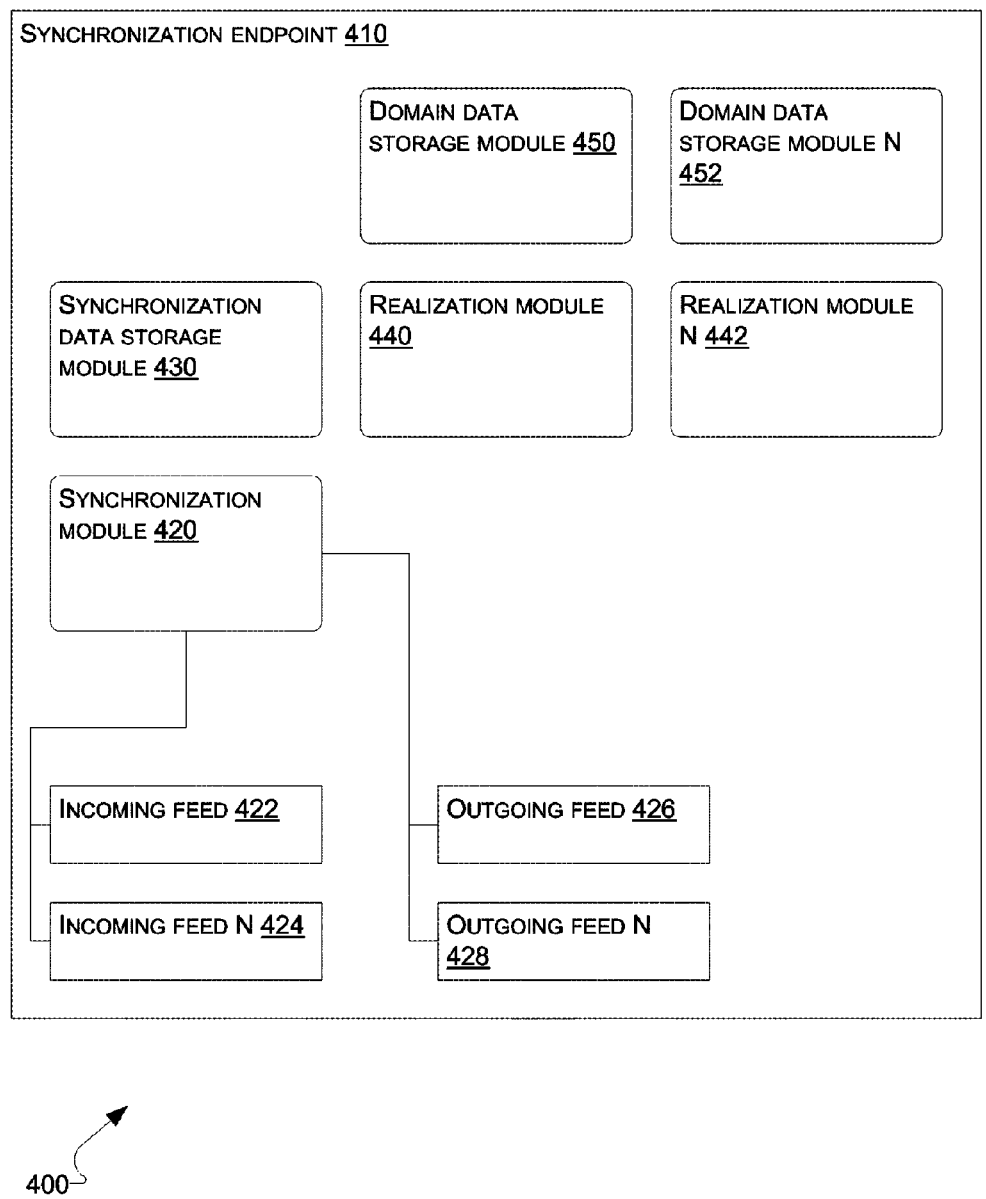
FIG. 4 illustrates an exemplary system that shows one embodiment of an endpoint that participates in a synchronization relationship and includes functionality for realizing synchronization data on to domain data.

Turning now to FIG. 4, shown therein is an exemplary system 400 that illustrates one embodiment of an endpoint that participates in a synchronization relationship and includes functionality for realizing synchronization data on to domain data. This description of FIG. 4 may be made with reference to other figures. However, it should be understood that the elements described with reference to FIG. 4 are not intended to be limited to being used with the elements described with reference to other figures. In addition, while the exemplary diagram in FIG. 4 indicates particular elements, in some implementations not all of these elements may exist, and in some implementations additional elements may exist. Furthermore, while the exemplary diagram shows elements as being part of or contained by a particular endpoint or computing device, for example, it should be noted that one or more modules associated with a particular endpoint may also be implemented by one or more other endpoints or computing devices and connected to the exemplary illustrated endpoint by any means sufficient for exchanging any necessary data.

The exemplary system 400 may contain a synchronization endpoint 410, a synchronization module 420, a synchronization data storage module 430, a realization module 440 and realization module N 442, a domain data storage module 450 and domain data storage module N 452, as well as an incoming feed 422, incoming feed N 424, outgoing feed 426, and outgoing feed N 428.

In general, in at least some implementations, the exemplary synchronization endpoint 410 may be similar to or the same as one of the endpoint A 110, endpoint B 120, or endpoint C 130, as described previously with reference to FIG. 1. The exemplary synchronization endpoint may contain multiple modules, including some or all of the illustrated modules, as part of an implementation that enables the sharing and synchronization of data, the realization of synchronization data on to domain data, and the generation of synchronization data from domain data. Furthermore, in some implementations, the endpoint may be implemented by a computing environment including the exemplary computing environment discussed below with reference to FIG. 5.

In at least some implementations, a synchronization module 420 may synchronize or transfer synchronization data between one or more other endpoints. A synchronization module may use a variety of communication mechanisms, including communication means local to a particular computing device, one or more network or other communication means that enable communication with other endpoints or computing devices, and so on. Furthermore, a synchronization module may use any of a variety of synchronization techniques, protocols, and the like, and any of a variety of means for representing the communicated or transferred synchronization data.

In just one specific example, a synchronization module 420 might synchronize information using techniques like those described by SSE, as introduced previously. In such an implementation, an exemplary synchronization module might obtain one or more feeds, including perhaps the exemplary incoming feed 422 and incoming feed N 424. In at least some implementations, an incoming feed might be represented using an XML document, like an RSS or Atom feed document. The exemplary outgoing feed 426 and outgoing feed N 428 may also be represented similarly.

Given a feed, the synchronization module might incorporate the changes represented by the feed into a data store. Such a data store might include, in some implementations, the store represented by the exemplary synchronization data storage module 430. In some implementations, the previously described operation 215, associated with FIG. 2, might be implemented by an exemplary synchronization module as part of incorporating changes represented by a feed. In implementations that use techniques like SSE, the synchronization module might incorporate the synchronization data by executing operations such as those that are part of an SSE merge.

In some implementations, the synchronization module 420 might also generate updated outgoing feeds—including perhaps the exemplary outgoing feed 426 or the outgoing feed N 428—when the synchronization data or domain data maintained by the synchronization endpoint 410 has changed. In some implementations, the previously described operation 330, associated with FIG. 3, might be implemented by an exemplary synchronization module as part of generating updated outgoing feeds.

As introduced previously, the synchronization module 420 might store synchronization data using a synchronization data storage module 430. Such a synchronization data storage module might generally store synchronization data in any of a wide variety of fashions or formats and be implemented in a variety of ways, including through the use of one or more databases, one or more files, and so on. In just one example that uses a synchronization protocol like SSE, a synchronization data storage module might store actual feed documents, including feed documents like the incoming feed 422 or the outgoing feed 426. It might store such feeds as files in a file system, as one or more records in one or more databases, or using any other data storage mechanism. While the synchronization data storage module might be controlled, maintained, or modified by the synchronization endpoint 410 and so therefore may be considered to be a "local" data store, in some cases the synchronization data storage module may actually store information using storage mechanisms that are located remotely from the synchronization endpoint. In such implementations, such remote storage may be accessed using one or more of a variety of communication means.

An exemplary realization module, such as the realization module 440 or the realization module N 442, may realize synchronization data on to domain data or in some cases participate in generating synchronization data from realized domain data. In some implementations, realizing synchronization data on to domain data may comprise, at least in part, the modification (including creation and deletion) of domain data based on synchronization data. In the same or other implementations, realizing synchronization data on to domain data may also comprise the mapping of synchronization data on to one or more alternate representations embodied in realized domain data, where "alternate" denotes that the domain data representation may not use all of the same data that exists in the corresponding synchronization data. One such a process for realizing synchronization data on to domain data was described in more detail previously with reference to FIG. 2.

Furthermore, when such alternate representations have been used when realizing synchronization data on to domain data, a realization module may also participate in generating or updating synchronization data after domain data has changed. One such example of synchronization data generation was described in more detail previously with reference to FIG. 3.

A realization module such as, perhaps, the exemplary realization module 440 or the exemplary realization module 442 may operate in a variety of ways depending on, among other things, the type or types of synchronization data and domain data processed by the realization module. For example, a realization module may interpret and realize particular types of synchronization data and might interact with particular types of domain data.

In some implementations, the domain data on to which a realization module realizes synchronization data may be stored in a domain data storage module, such as the exemplary domain data storage module 450 or the exemplary domain data storage module 452. For example, in a case where synchronization data defines directories and files, the domain data storage module 450 might comprise one or more file systems, and the domain data might comprise actual directories and files. In such an example, a "file system realization module" might use synchronization data that includes information such as file metadata, as well as file contents, to create or modify actual files in one or more locations in the file systems embodied by a domain data storage module.

A file system realization module might also include logic, executable code, or the like, that recognizes and takes various actions when the synchronization data processed by the realization module should or must be modified to comprise valid domain data. For example, as has been previously introduced, a realization module might recognize when a directory or file in the synchronization data has a name that is invalid or not allowed in a file system associated with the realization module. In such a case, the realization module might also include logic or executable code to take some action that would resolve such an issue or incompatibility, such as using an alternate name in the realized domain data and perhaps also mapping back to the original name if the domain data is later used to generate synchronization data to be synchronized to other endpoints.

In some implementations, more than one realization module might exist that operates on or with the same synchronization data. For example, when using the same synchronization data—for example, perhaps when using the same feed document with directory and file information—more than one realization module might exist, and each realization module might operate differently. For example, different realization modules might exist that realize the synchronization data on to domain data in different ways. For example, one realization module might realize directory and file synchronization information on to files and directories that use a particular type of file system. Another realization module might realize (possibly the same) directory and file synchronization data on to files and directories that use a different type of file system. In another example, one file system might allow a particular set of characters in names, another file system might allow a different set of characters, and the synchronization data communicated between endpoints might support yet another set of characters. In such an example, different realization modules may have the capability of generating domain data that conforms to the particular requirements and limitations of the domain data—the file system in this case—that the realization module supports, and to be able to map or otherwise resolve such limitations.

In some implementations, this design may also enable existing realization modules to be changed without requiring that the synchronization data or other realization modules change, and may enable new realization modules—perhaps that support new endpoints or ways of representing synchronization information—to be added without necessarily changing the synchronization data, the synchronization techniques, or other endpoints.

As has been previously explained, it may be possible in some implementations for different endpoints to include different realization modules that accept and generate synchronization information that can be read and interpreted by each endpoint. In some implementations, different realization modules that use the same synchronization data may operate on the same endpoint. In one such example, a computer system might have different storage devices that use different file systems. In such an environment, different realization modules that are associated with the same computer system might modify domain data on the different storage devices—perhaps as files and directories—using the same synchronization data. That is, the same synchronization data might result in two different sets of directories and files, one set for each file system. Furthermore, changes made by one realization module for one file system may not necessarily be made by the other realization module for the other file system.

In the same or other examples, an endpoint might have one or more other realization modules that operate on the same directory and file synchronization data but that modify different types of domain data (that is, other than actual files and directories). One example of a different type of domain data and corresponding realization module might be a realization module that modifies a ZIP or other archive or file type that has the ability to represent a hierarchy of multiple files and possibly directories in a single file. With such a realization module, realizing synchronization data might comprise creating one or more ZIP files that contain directories and files communicated as part of the same synchronization data that may be used elsewhere to modify discrete files and directories.

Another example of a different type of domain data and realization module might be the realization module used by a "web projection." In such an environment, a user might be able to access directories and files using, for example, a web interface comprised of one or more HTML pages. In one example, an HTML page might display links for files and enable a user to download a file by clicking one of the displayed links. While one implementation of such a user interface might simply recreate directories and files on, say, a web server (and so could possibly be implemented using a file system realization module), another implementation might use a realization module that might, for example, use the synchronization data to populate a database, and then generate the HTML interface, and serve file content, from the database. In such an example, the database might be considered to comprise at least some of the domain data created or modified by the realization module. Such a realization module, while operating on synchronization data that represents directories and files, might not actually create actual directories or files.

It should also be noted again that while a number of the preceding examples have been explained with reference to exemplary directory and file synchronization data, that the elements of FIG. 4 may also or instead be used to synchronize, store, and realize a variety of other types of data.

Example Computing Environment

Figure 5:
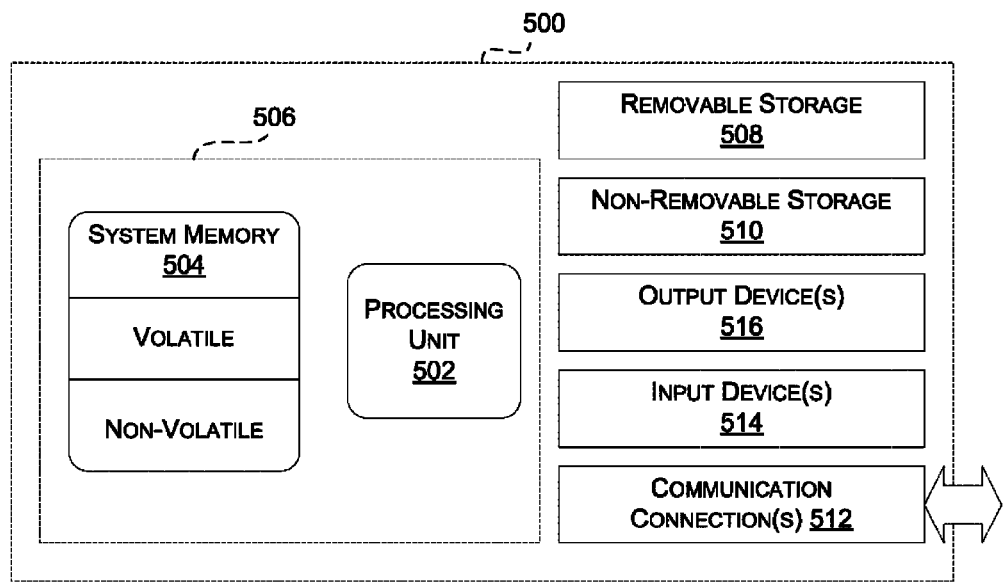
FIG. 5 illustrates an exemplary computer device in which the various technologies described herein may be implemented.

Turning now to FIG. 5, this figure and the related discussion are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 500 illustrated in FIG. 5.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 500 illustrated in FIG. 5, in its most basic configuration, includes at least one processing unit 502 and memory 504. In some implementations, the computing device 500 may implement at least part of, for example, one of the endpoints described previously with reference to FIG. 1, such as endpoint A 110, endpoint B 120, and so on. In the same or other implementations, the computing device might implement at least part of the synchronization endpoint 410 described previously with reference to FIG. 4. In some implementations, the processing unit 502 may be a general purpose central processing unit (CPU), as exists, for example, on a variety of computers, including desktop and laptop computers. Depending on the exact configuration and type of computing device, the memory 504 may be volatile (such as RAM), non-volatile (such as ROM, flash memory, etc.), or some combination of the two. This most basic configuration is illustrated in FIG. 5 by dashed line 506. Additionally, the computing device 500 may also have additional features and functionality. For example, the computing device 500 may also include additional storage (removable and/or non-removable) including, but not limited to, magnetic or optical disks or tape. Such additional storage is illustrated in FIG. 5 by the removable storage 508 and the non-removable storage 510.

The computing device 500 may also contain one or more communications connection(s) 512 that allow the computing device 500 to communicate with other devices and services.

For example, the computing device might have one or more connections to a variety of communication means or computing devices, including, for example, connections to endpoints as described previously with reference to FIG. 1. Such connections may in some cases comprise connections to the communications means 115, also described previously with reference to FIG. 1. The computing device 500 may also have one or more input device(s) 514 such as an image input devices like cameras or scanners, keyboards, mice, pens, voice input devices including microphone arrays, touch input devices, and so on. One or more output device(s) 516 such as a display, speakers, printer, and so on, may also be included in the computing device 500.

Those skilled in the art will appreciate that the technologies described herein may be practiced with computing devices other than the computing device 500 illustrated in FIG. 5. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, at some level of detail, by the system of FIG. 5, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications and substitutions without departing from the spirit set forth and defined by the following claims.

What is claimed is:

1. One or more computer-readable storage media comprising instructions which, when executed by one or more processing devices, cause the one or more processing devices to perform:
    storing local domain data, the local domain data being stored based on local system constraints;
    obtaining synchronization data corresponding to the local domain data, the synchronization data reflecting an update that is invalid according to the local system constraints;
    realizing the synchronization data onto the local domain data, the realizing including modifying the update to be valid according to the local system constraints; and
    generating updated synchronization data that includes the update that is invalid according to the local system constraints.

2. The one or more computer-readable storage media according to claim 1, wherein the local system constraints include file system constraints.

3. The one or more computer-readable storage media according to claim 1, further comprising instructions which, when executed by the one or more processing devices, cause the one or more processing devices to perform:
    sending the updated synchronization data to a remote endpoint.

4. The one or more computer-readable storage media according to claim 3, wherein:
    the local system constraints indicate a limited representation or limited functionality for the update, and
    the remote endpoint fully implements the update without the limited representation or the limited functionality.

5. The one or more computer-readable storage media according to claim 3, wherein the updated synchronization data does not reflect the modifying of the update to be valid according to the local system constraints.

6. The one or more computer-readable storage media according to claim 1, further comprising instructions which, when executed by the one or more processing devices, cause the one or more processing devices to perform:
    storing a data structure that records how the update is modified to be valid according to the local system constraints,
    wherein the updated synchronization data is generated based on the data structure.

7. The one or more computer-readable storage media according to claim 1, wherein the synchronization data is obtained by receiving an incoming feed.

8. The one or more computer-readable storage media according to claim 7, further comprising instructions which, when executed by the one or more processing devices, cause the one or more processing devices to perform:
    sending the updated synchronization data to a remote endpoint in an outgoing feed.

9. The one or more computer-readable storage media according to claim 1, wherein the update reflects a file name that is invalid according to the local system constraints, and the file name is modified to be valid as part of the realizing.

10. The one or more computer-readable storage media according to claim 9, wherein the updated synchronization data is generated by mapping from the modified file name back to the file name that is invalid according to the local system constraints.

11. A system comprising:
    a device configured to:
        store local domain data, the local domain data being stored based on local system constraints;
        obtain synchronization data corresponding to the local domain data, the synchronization data reflecting an update that is invalid according to the local system constraints;
        realize the synchronization data onto the local domain data by modifying the update to be valid according to the local system constraints; and
        generate updated synchronization data that includes the update that is invalid according to the local system constraints.

12. The system according to claim 11, wherein the local system constraints include file system constraints.

13. The system according to claim 11, wherein the device is further configured to send the updated synchronization data to a remote endpoint.

14. The system according to claim 13, wherein:
    the local system constraints indicate a limited representation or limited functionality for the update, and
    the remote endpoint fully implements the update without the limited representation or the limited functionality.

15. The system according to claim 13, wherein the updated synchronization data does not reflect the modifying of the update to be valid according to the local system constraints.

16. The system according to claim 11, wherein the device is further configured to:

store a data structure that records how the update is modified to be valid according to the local system constraints, wherein the updated synchronization data is generated based on the data structure.

17. The system according to claim 11, wherein the synchronization data is obtained by receiving an incoming feed, and the device is further configured to:

send the updated synchronization data to a remote endpoint in an outgoing feed.

18. The system according to claim 11, wherein the update reflects a file name that is invalid according to the local system constraints, and the file name is modified to be valid as part of the modifying.

19. The system according to claim 18, wherein the updated synchronization data is generated by mapping from the modified file name back to the file name that is invalid according to the local system constraints.

20. A method comprising:

obtaining, by a local endpoint, synchronization data corresponding to local domain data, the synchronization data being received from a first remote endpoint and including at least one character that is not supported by the local endpoint;

modifying the local domain data based on the synchronization data, the modifying excluding the at least one character that is not supported by the local endpoint; and sending, to a second remote endpoint, updated synchronization data that includes the at least one character that is not supported by the local endpoint.

* * * * *